(12) United States Patent
Kobayashi et al.

(10) Patent No.: US 11,433,474 B2
(45) Date of Patent: Sep. 6, 2022

(54) ULTRASONIC BONDING METHOD

(71) Applicant: Toshiba Mitsubishi-Electric Industrial Systems Corporation, Chuo-ku (JP)

(72) Inventors: Hiroshi Kobayashi, Tokyo (JP); Yoshihito Yamada, Tokyo (JP); Akihiro Ichinose, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 417 days.

(21) Appl. No.: 16/630,875

(22) PCT Filed: Mar. 13, 2019

(86) PCT No.: PCT/JP2019/010238
§ 371 (c)(1),
(2) Date: Jan. 14, 2020

(87) PCT Pub. No.: WO2020/183641
PCT Pub. Date: Sep. 17, 2020

(65) Prior Publication Data
US 2021/0220940 A1    Jul. 22, 2021

(51) Int. Cl.
*B23K 20/00* (2006.01)
*B23K 20/10* (2006.01)
(Continued)

(52) U.S. Cl.
CPC ........... *B23K 20/10* (2013.01); *B23K 20/002* (2013.01); *B23K 2101/40* (2018.08); *B23K 2103/54* (2018.08); *B23K 2103/56* (2018.08)

(58) Field of Classification Search
CPC .......... H01L 2224/85205; B23K 20/26; B23K 37/04; B23K 20/10; B23K 20/22; B23K 20/24
See application file for complete search history.

(56) References Cited

U.S. PATENT DOCUMENTS 6,006,981 A * 12/1999 Madrid .................. H01L 24/50
                                                     228/180.5
9,789,572 B1 * 10/2017 Cheung ................. B23P 21/004
(Continued)

FOREIGN PATENT DOCUMENTS

JP         2012-4280 A      1/2012
JP         2016-87666 A     5/2016

OTHER PUBLICATIONS

Written Opinion of the International Searching Authority dated May 21, 2019 in PCT/JP2019/010238, (with English translation ), 9 pages.

(Continued)

*Primary Examiner* — Erin B Saad
(74) *Attorney, Agent, or Firm* — Oblon, McClelland, Maier & Neustadt, L.L.P.

(57) ABSTRACT

In an ultrasonic bonding method, three ultrasonic bonding head units are disposed above a bonding target. At this time, initial heights in the three ultrasonic bonding head units are set to different heights from each other. Thereafter, a batch multiple lowering operation by a lifting-lowering servomotor and ultrasonic vibration operations by the three ultrasonic bonding head units are executed. At this time, a lowering speed V6 of the batch multiple lowering operation, an operation time T6 (min) of the ultrasonic vibration operation, and an adjustment gap length Δg among the initial heights are set to satisfy {T6<Δg/V6}.

5 Claims, 10 Drawing Sheets

(51) Int. Cl.
    *B23K 103/00*         (2006.01)
    *B23K 101/40*         (2006.01)

(56) References Cited

U.S. PATENT DOCUMENTS

| | | | | |
|---|---|---|---|---|
| 11,298,775 | B2* | 4/2022 | Hahnlen | B23K 37/04 |
| 2004/0074947 | A1* | 4/2004 | Hillebrand | B65D 75/42 |
| | | | | 228/110.1 |
| 2018/0345587 | A1* | 12/2018 | Watts | B29C 66/9221 |
| 2019/0358739 | A1* | 11/2019 | Hahnlen | B33Y 30/00 |
| 2022/0002112 | A1* | 1/2022 | Ichinose | B65H 49/26 |

OTHER PUBLICATIONS

International Search Report dated May 21, 2019 in PCT/JP2019/010238 filed on Mar. 13, 2019.

* cited by examiner

F I G. 1
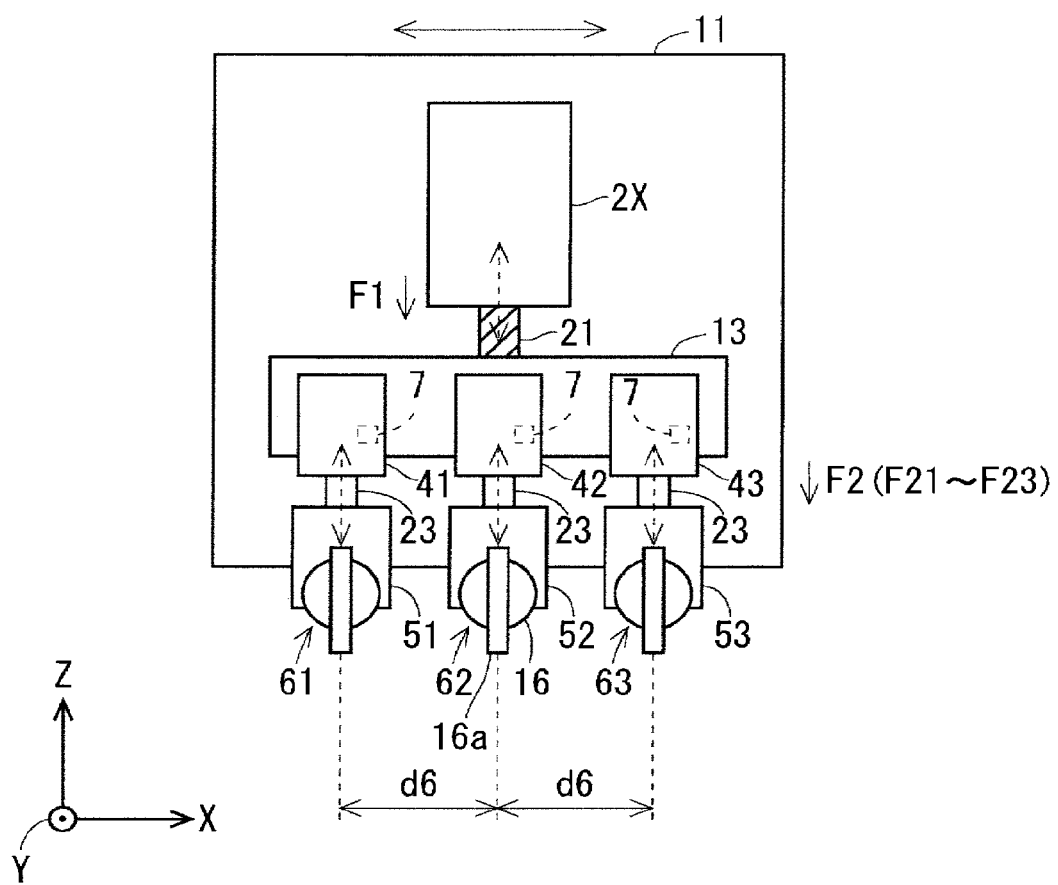

F I G. 8
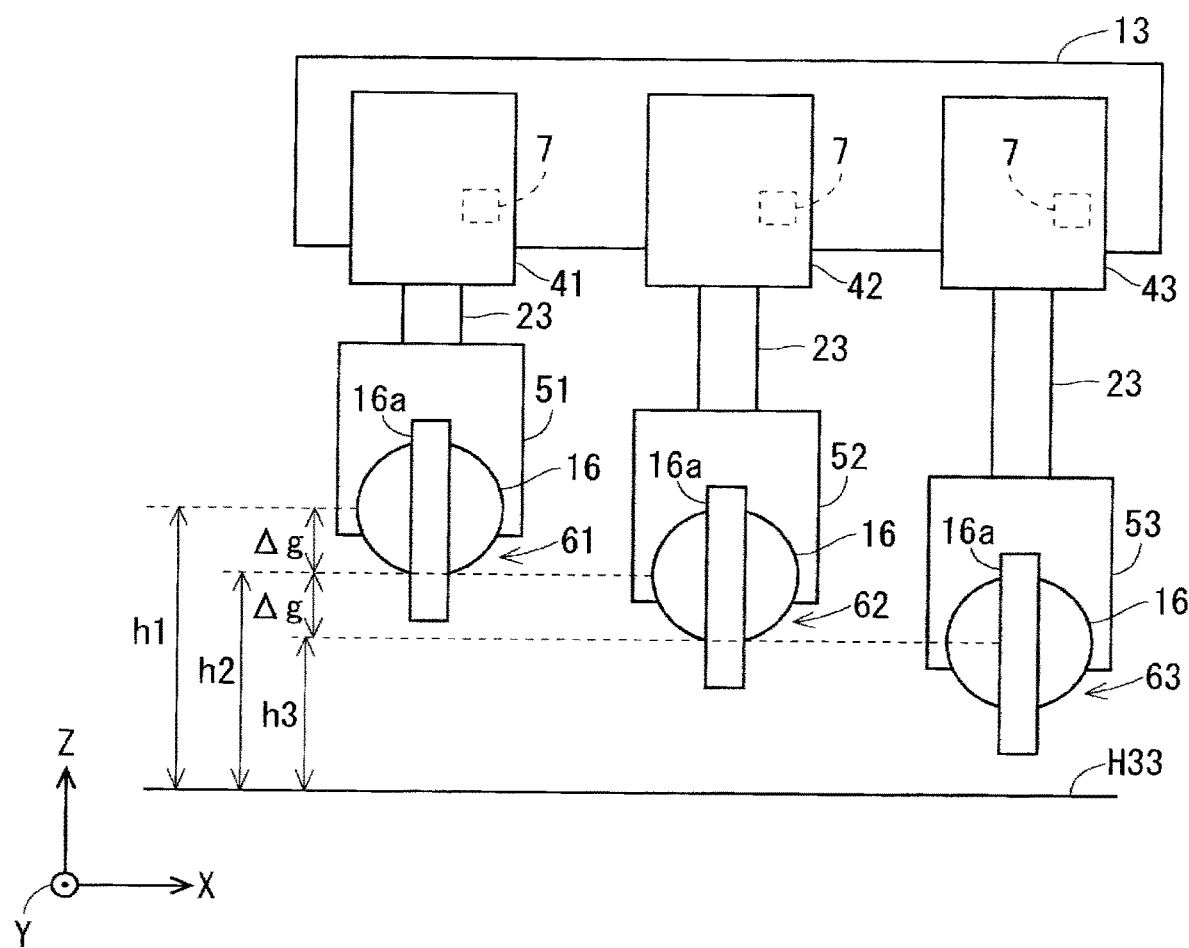

ULTRASONIC BONDING METHOD

TECHNICAL FIELD

The present invention relates to an ultrasonic bonding method, and particularly relates to an ultrasonic bonding method for conductive members used in a solar cell as a bonding target.

BACKGROUND ART

Conventionally, after disposing an electrode wire for collecting current, which is a conductive member, on an upper surface of a substrate for a thin-film solar cell, in a step of bonding the electrode wire to the substrate, an ultrasonic vibration bonding apparatus has been used, which executes an ultrasonic bonding process to apply ultrasonic waves while applying pressure to the electrode wire disposed on the substrate.

As an ultrasonic bonding method performed using an ultrasonic vibration bonding apparatus, for example, there is a member bonding method disclosed in Patent Document 1.

PRIOR ART DOCUMENTS

Patent Documents

Patent Document 1: Japanese Patent Application Laid-Open No. 2012-4280

SUMMARY

Problem to be Solved by the Invention

On the other hand, as the number of bonding positions increases due to increase in size of the solar cell substrate and mass production of solar cells is in progress, shortening of production takt times has become essential.

Accordingly, a multi-position ultrasonic bonding method is conceivable that uses a plurality of ultrasonic vibration bonding apparatuses each having an ultrasonic bonding portion, and performs ultrasonic bonding simultaneously on a plurality of bonding positions by a plurality of ultrasonic bonding portions on a bonding target such as an electrode wire of a solar cell.

However, in the conventional multi-position ultrasonic bonding method, a plurality of ultrasonic vibrations are simultaneously applied to the plurality of bonding positions from the plurality of ultrasonic bonding portions. For this reason, a wave motion accompanying one ultrasonic vibration among the plurality of ultrasonic vibrations cancels a wave motion of another ultrasonic vibration, thereby causing a phenomenon of bonding failure such that the ultrasonic vibrations cannot be applied appropriately.

When the bonding failure phenomenon occurs, there is a problem that bonding cannot be performed with high accuracy at a position where a suitable ultrasonic vibration is not applied among the plurality of bonding positions.

An object of the present invention is to provide an ultrasonic bonding method that solves the above-described problem and is capable of performing ultrasonic bonding efficiently and accurately on a plurality of bonding positions of a bonding target.

Means to Solve the Problem

An ultrasonic bonding method according to the present invention is an ultrasonic bonding method performed using an ultrasonic vibration bonding apparatus, in which the ultrasonic vibration bonding apparatus includes a plurality of ultrasonic bonding head units that each have an ultrasonic bonding portion, and that execute a plurality of ultrasonic vibration operations by applying ultrasonic vibrations from a plurality of ultrasonic bonding portions, and the ultrasonic bonding method includes the steps of (a) disposing a bonding target on a table, and (b) controlling the plurality of ultrasonic bonding head units to execute the plurality of ultrasonic vibration operations on the bonding target as an ultrasonic bonding target, in which the step (b) causes the plurality of ultrasonic vibration operations to be executed so as to satisfy an ultrasonic time condition in which the ultrasonic vibration operations do not overlap in time among the plurality of ultrasonic bonding head units.

Effects of the Invention

Since the present invention according to claim 1 has the above-described characteristics, an ultrasonic wave motion generated when one ultrasonic vibration operation out of the plurality of ultrasonic vibration operations is executed does not adversely affect the other ultrasonic vibration operations. Thus, ultrasonic bonding on a plurality of bonding positions of bonding targets can be performed efficiently and with high accuracy.

The objects, features, aspects and advantages of the present invention will be more apparent from the following detailed description and the accompanying drawings.

BRIEF DESCRIPTION OF DRAWINGS

FIG. 1 is an explanatory view schematically illustrating a structure of an ultrasonic vibration bonding apparatus used in an ultrasonic bonding method according to an embodiment of the present invention.

FIG. 8 is an explanatory view schematically illustrating an initial setting state of three ultrasonic bonding head units.

DESCRIPTION OF EMBODIMENTS

Embodiment (Ultrasonic vibration bonding apparatus)

Figure 2:
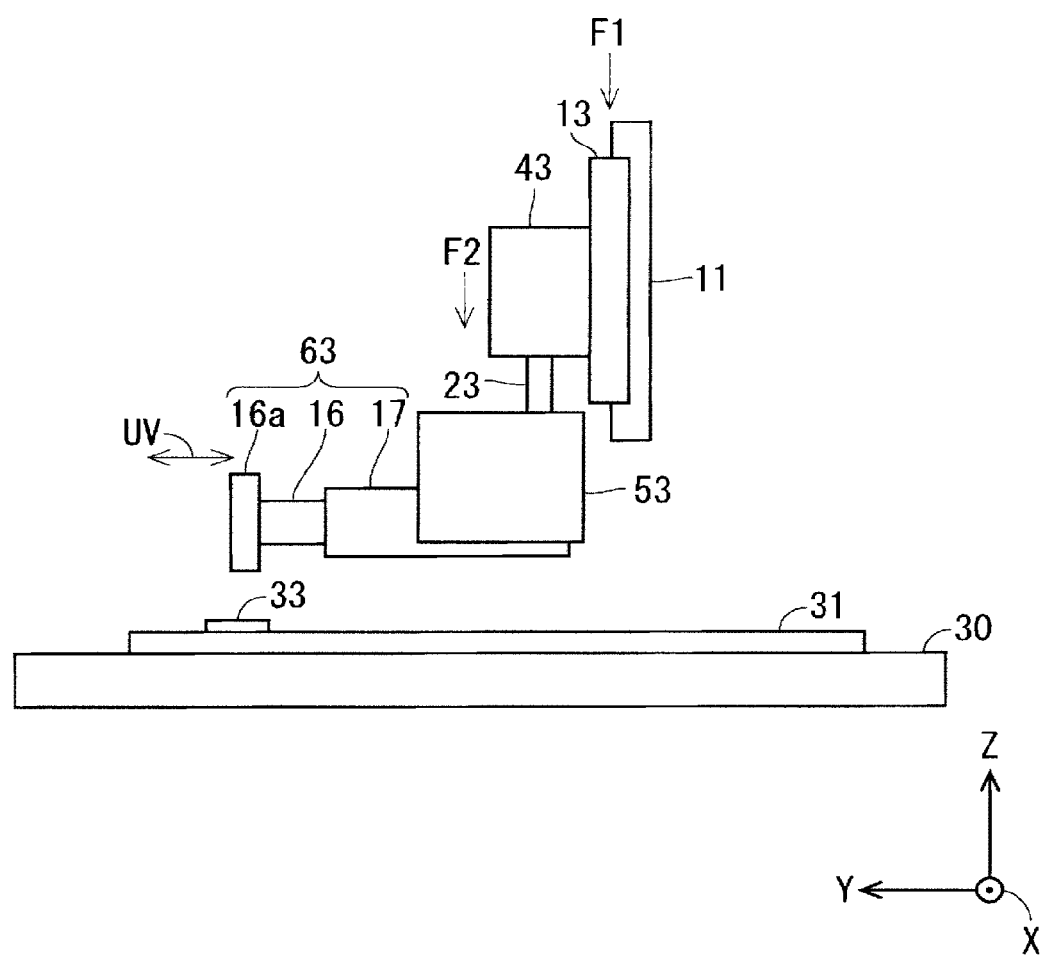
FIG. 2 is an explanatory view schematically illustrating a part of the structure of the ultrasonic vibration bonding apparatus illustrated in FIG. 1.

FIG. 1 is an explanatory view schematically illustrating a structure of an ultrasonic vibration bonding apparatus used in an ultrasonic bonding method according to an embodiment of the present invention. An XYZ orthogonal coordinate system is illustrated in FIG. 1.

As illustrated in FIG. 1, in a three-head traveling frame 11 movable in a horizontal direction (X direction), a lifting-lowering servomotor 2X is fixed to a side surface having an XZ plane.

An upper end (+Z direction) of a screw shaft 21 is attached to the lifting-lowering servomotor 2X, and a lower end of the screw shaft 21 is attached to a common lifting-lowering slider 13 in a manner to be connected to the common lifting-lowering slider 13 via a nut that is not illustrated.

In such a configuration, when the screw shaft 21 is rotated in a first rotation direction by driving the lifting-lowering servomotor 2X, a lowering operation of moving the common lifting-lowering slider 13 downward (−Z direction) can be performed.

On the other hand, when the screw shaft 21 is rotated in a second rotation direction (rotation direction opposite to the first rotation direction) by the lifting-lowering servomotor 2X, a lifting operation of moving the common lifting-lowering slider 13 upward (+Z direction) can be performed.

As described above, the lifting-lowering servomotor 2X functions as a head unit moving mechanism, which combines a lowering mechanism that performs the above-described lowering operation and a lifting mechanism that performs the above-described lifting operation.

Three air cylinders 41 to 43 are attached to a side surface of the common lifting-lowering slider 13 having the XZ plane.

Three pressurizing sliders 51 to 53 are provided corresponding to the three air cylinders 41 to 43, and are coupled a pressurizing slider 5i to a tip portion of a piston rod 23 of the air cylinder 4i (i=one of 1 to 3). Further, each of the air cylinders 41 to 43 has a position detection unit 7 therein. Note that (i=one of 1 to 3) means (i=any one of 1 to 3) exactly.

Three ultrasonic bonding head units 61 to 63 are provided corresponding to the three pressurizing sliders 51 to 53, and an ultrasonic bonding head unit 6i is attached to a lower region of the pressurizing slider 5i (i=one of 1 to 3). Each of the ultrasonic bonding head units 61 to 63 includes an ultrasonic horn 16 (ultrasonic bonding portion 16a) and an ultrasonic vibrator 17 as main components.

FIG. 2 is an explanatory view schematically illustrating a part of the structure of the ultrasonic vibration bonding apparatus illustrated in FIG. 1. FIG. 1 corresponds to a front view seen from an XZ plane, and FIG. 2 corresponds to a side view seen from a YZ plane.

As illustrated in FIG. 2, an air cylinder 43 is directly attached to the side surface of the common lifting-lowering slider 13 having the XZ plane. Note that in the following, out of the air cylinders 41 to 43, the air cylinder 43 and parts related to the air cylinder 43 (a pressurizing slider 53, an ultrasonic bonding head unit 63, and so on) will be described as representatives.

A pressurizing slider 53 is connected to a tip portion of the piston rod 23 of the air cylinder 43. Specifically, the piston rod 23 and the pressurizing slider 53 are connected to each other via an attaching bracket 75, which will be described later, provided in a tip region of the tip portion of the piston rod 23. In addition, the air cylinder 43 has a position detection unit 7 in the air cylinder 43, which will be described later in detail.

Then, an ultrasonic bonding head unit 63 is attached to a lower region of the pressurizing slider 53. The ultrasonic bonding head unit 63 includes an ultrasonic horn 16 and an ultrasonic vibrator 17 as main components, and a tip portion of the ultrasonic horn 16 is an ultrasonic bonding portion 16a.

The ultrasonic bonding head unit 63 is formed extending in a head formation direction (Y direction) in the order of the ultrasonic vibrator 17 and the ultrasonic horn 16, and has the ultrasonic bonding portion 16a on a tip portion of the ultrasonic horn 16.

The ultrasonic bonding head unit 63 causes the ultrasonic vibrator 17 to generate ultrasonic vibrations UV, and transmits the ultrasonic vibrations UV to the ultrasonic bonding portion 16a via the ultrasonic horn 16, thereby executing an ultrasonic vibration operation of applying ultrasonic vibrations to an application portion (bonding position) of a bonding target from the ultrasonic bonding portion 16a.

Note that as the bonding target as an ultrasonic bonding target, for example, as illustrated in FIG. 2, a glass substrate 31 placed on a table 30 and a linear (current-collecting) electrode 33 disposed on an upper surface of the glass substrate 31 are conceivable. A predetermined position on an upper surface of the electrode 33, which is a conductive member, is an application portion, and ultrasonic bonding of the electrode 33 and the glass substrate 31 can be performed on the application portion (bonding region) of the electrode 33 by the ultrasonic vibration operation by the ultrasonic bonding head unit 63. Note that the glass substrate 31 is used as a substrate such as a solar cell panel having a solar cell function inside.

Note that the air cylinder 43 illustrated in FIG. 2 and the parts related to the air cylinder 43 (the pressurizing slider 53, the ultrasonic bonding head unit 63, and so on) have been described as representatives. The air cylinder 41 and the parts related to the air cylinder 41 (the pressurizing slider 51, the ultrasonic bonding head unit 61, and so on) and the air cylinder 42 and the parts related to the air cylinder 42 (the pressurizing slider 52, the ultrasonic bonding head unit 62, and so on) which are not illustrated in FIG. 2 also have configurations similar to the air cylinder 43 and the parts related to the air cylinder 43.

The ultrasonic bonding portion 16a of the ultrasonic bonding head unit 61, the ultrasonic bonding portion 16a of the ultrasonic bonding head unit 62, and the ultrasonic bonding portion 16a of the ultrasonic bonding head unit 63 are disposed evenly every interval d6 along the X direction.

As described above, each of the ultrasonic bonding head units 61 to 63 causes the ultrasonic vibrator 17 to generate ultrasonic vibrations UV, and transmits the ultrasonic vibrations UV to the ultrasonic bonding portion 16a via the ultrasonic horn 16, thereby executing an ultrasonic vibration operation of applying ultrasonic vibrations to the application portion of the bonding target from the ultrasonic bonding portion 16a.

Therefore, when the ultrasonic vibration operation of the ultrasonic bonding head units 61 to 63 is executed, ultrasonic bonding is performed on three bonding positions along the X direction of the bonding target such as the electrode 33.

(Control Unit)

Figure 3:
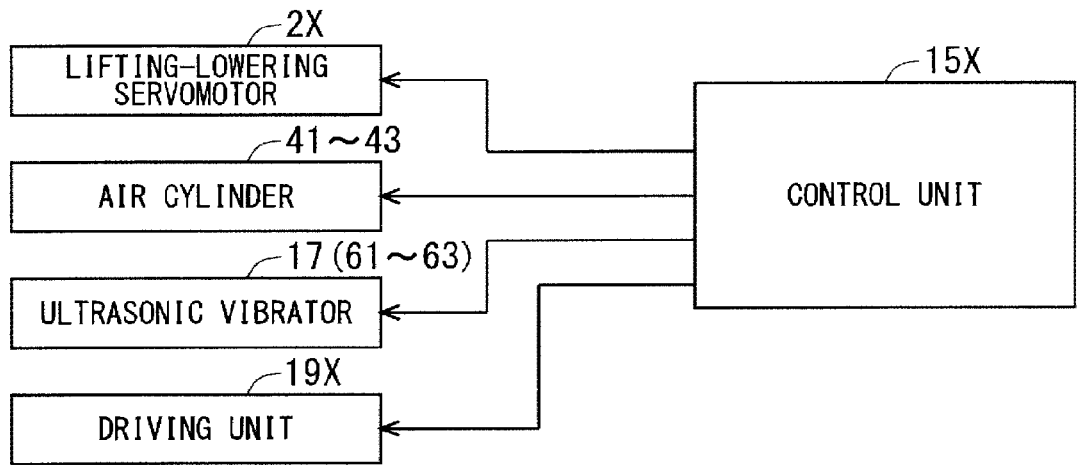
FIG. 3 is a block diagram schematically illustrating a control system of the ultrasonic vibration bonding apparatus illustrated in FIGS. 1 and 2.

FIG. 3 is a block diagram schematically illustrating a control system of the ultrasonic vibration bonding apparatus illustrated in FIGS. 1 and 2. As illustrated in FIG. 3, the control unit 15X executes a control operation controlling driving of the lifting-lowering servomotor 2X, the air cylinders 41 to 43, the respective ultrasonic vibrators 17 in the ultrasonic bonding head units 61 to 63, and the driving unit 19X.

Note that the driving unit 19X executes a movement process of moving the three-head traveling frame 11 in the horizontal direction. Further, the ultrasonic vibrator 17 of the ultrasonic bonding head unit 6$i$ (i=one of 1 to 3) executes an ultrasonic vibration operation of applying ultrasonic vibrations UV to the ultrasonic bonding portion 16$a$ via the ultrasonic horn 16.

The control unit 15X can control a pressing force F1 in the −Z direction by the lifting-lowering servomotor 2X by controlling driving of the lifting-lowering servomotor 2X, and can control a pressing force F2 (F21 to F23) of each of the air cylinders 41 to 43 in the −Z direction by controlling each of the air cylinders 41 to 43. The pressing forces F1 and F2 satisfy the relationship of "F1>F2".

The ultrasonic bonding head units 61 to 63 are coupled to the common lifting-lowering slider 13 via the pressurizing sliders 51 to 53, the piston rods 23 of the air cylinders 41 to 43, and the air cylinders 41 to 43. Therefore, the pressing force F1 in the −Z direction generated at a time of a lowering operation executed by driving of the lifting-lowering servomotor 2X is a lowering pressing force in a lowering operation common to the ultrasonic bonding head units 61 to 63.

Since the ultrasonic bonding head unit 6$i$ (i=one of 1 to 3) is coupled to the air cylinder 4$i$ via the pressurizing slider 5$i$ and the piston rod 23 of the air cylinder 4$i$, a pressing force F2$i$ is a pressurizing pressing force to be applied to the ultrasonic bonding head unit 6$i$ by the air cylinder 4$i$. Note that the pressing forces F21 to F23 are set to satisfy "F21=F22=F23 (=F2)".

The control unit 15X can control a movement process of the three-head traveling frame 11 along the horizontal direction by controlling the driving unit 19X.

Further, the control unit 15X can control the ultrasonic vibration operation of the ultrasonic bonding head unit 6$i$ by controlling the ultrasonic vibrator 17 of the ultrasonic bonding head unit 6$i$ (i=one of 1 to 3).

The ultrasonic vibration bonding apparatus having such a configuration can execute an ultrasonic bonding process constituted of steps S11 to S14 below under control of the control unit 15X. That is, the control unit 15X executes a control operation constituted of steps S11 to S14.

Step S11: the ultrasonic bonding portions 16$a$ of the ultrasonic bonding head units 61 to 63 are disposed to be located above the three application portions of the bonding target described above. At this time, the ultrasonic bonding portions 16$a$ of the ultrasonic bonding head units 61 to 63 are disposed in an initial setting state described in detail later.

Step S12: the air cylinders 41 to 43 are caused to execute a pressurizing operation with the pressing forces F21 to F23.

Step S13: the screw shaft 21 is rotated in the first rotation direction by driving the lifting-lowering servomotor 2X, thereby executing a batch multiple lowering operation of moving the common lifting-lowering slider 13, the air cylinders 41 to 43, the pressurizing sliders 51 to 53, and the ultrasonic bonding head units 61 to 63 downward at once. At this time, the lifting-lowering servomotor 2X as the head unit moving mechanism is controlled so that the pressure value in the −Z direction becomes the pressing force F1.

Step S14: the position detection unit 7 of the air cylinder 4$i$ (i=one of 1 to 3) detects presence or absence of a bonding portion contact state in which the lower tip portion of the ultrasonic bonding portion 16$a$ of the ultrasonic bonding head unit 6$i$ contacts the application portion of the bonding target. This point will be described in detail below.

Figure 4:
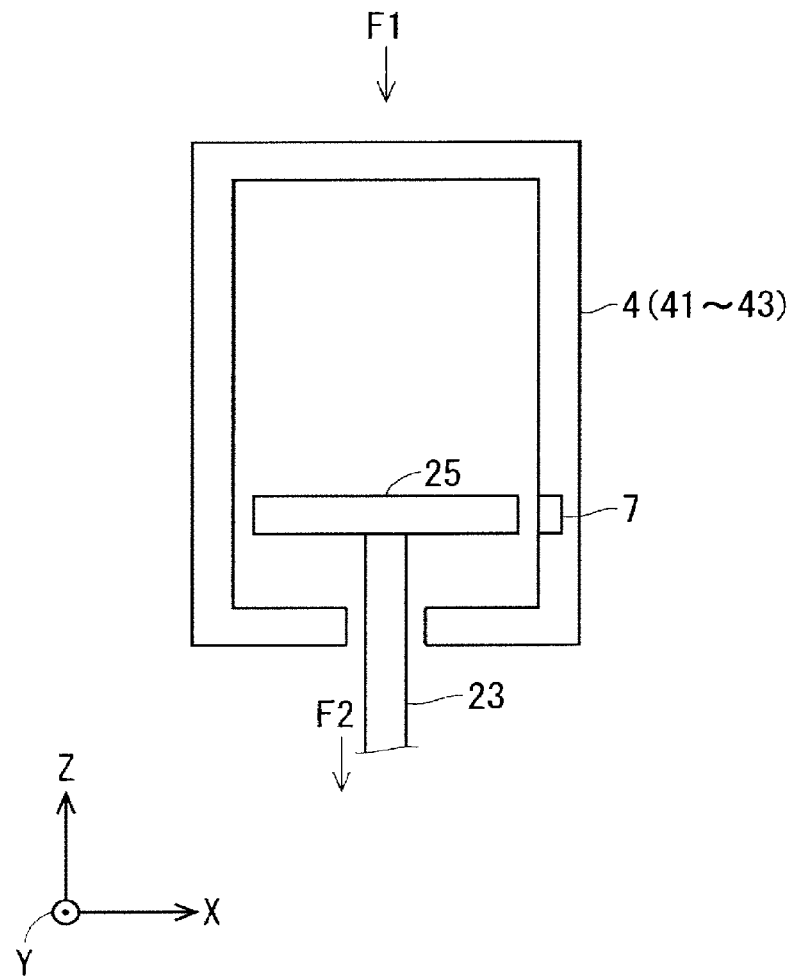
FIG. 4 is an explanatory view (part 1) schematically illustrating an internal state of an air cylinder illustrated in FIG. 1.
Figure 5:
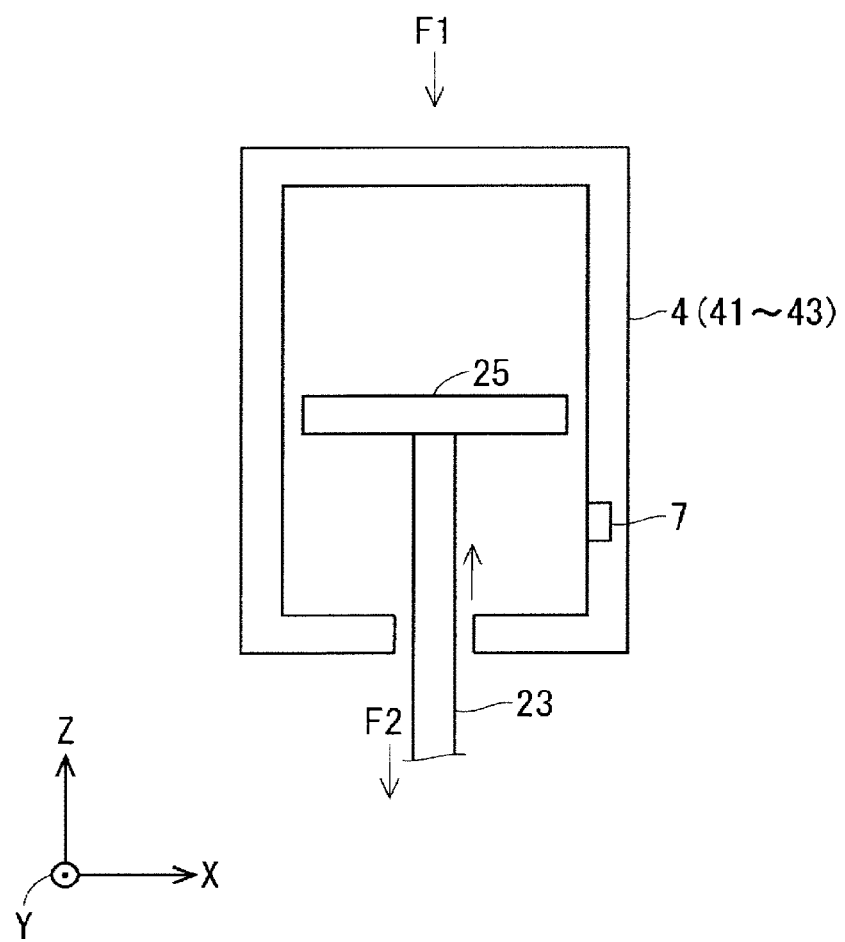
FIG. 5 is an explanatory view (part 2) schematically illustrating an internal state of the air cylinder illustrated in FIG. 1.

FIGS. 4 and 5 are explanatory views schematically illustrating an internal state of the air cylinder 4 (any one of the air cylinders 41 to 43). FIG. 4 illustrates a status of a bonding portion non-contact period, and FIG. 5 illustrates a status after a bonding portion contact state. An XYZ orthogonal coordinate system is illustrated in each of FIG. 4 and FIG. 5.

As illustrated in FIG. 4, in the bonding portion non-contact period, the air cylinder 4 is in a state that the pressurizing operation of the pressing force F2 by the air cylinder 4 itself is possible while being lowered by the pressing force F1 by the lifting-lowering servomotor 2X. At this time, since the ultrasonic bonding portion 16$a$ is not in contact with the bonding target, the position of the piston 25 is fixed at a predetermined position below the air cylinder 4.

Therefore, a period in which it is detected that the piston 25 is present at the predetermined position by the position detection unit 7 provided on the side surface of the air cylinder 4 is the bonding portion non-contact period.

As illustrated in FIG. 5, after the bonding portion contact state is established, the lower tip portion of the ultrasonic bonding portion 16$a$ abuts on the bonding target, and thus the air cylinder 4 stops without being lowered.

At this time, since the pressing force F1>the pressing force F2, the piston 25 is lifted from the predetermined position by this pressure difference (F1-F2).

Therefore, when it is detected by the position detection unit 7 provided on the side surface of the air cylinder 4 that the piston 25 has risen from the predetermined position, it can be recognized that the bonding portion contact state is established.

Among the ultrasonic bonding head units 61 to 63, the ultrasonic bonding head unit 6$i$ (any one of i=1 to 3) in which a bonding portion contact state is recognized is caused to execute an ultrasonic vibration operation independently.

Thereafter, when an entire bonding portion contact state is recognized in which the bonding portion contact state is detected in all the ultrasonic bonding head units 61 to 63, and execution of the ultrasonic vibration operation of all the ultrasonic bonding head units 61 to 63 is completed, the process of step S14 is finished.

Further, since the ultrasonic vibration bonding apparatus illustrated in FIGS. 1 to 5 has the three ultrasonic bonding head units 61 to 63 as a plurality of ultrasonic bonding head units, when a plurality of bonding positions exist in the bonding target as the ultrasonic bonding target, the ultrasonic bonding process on the plurality of bonding positions can be completed early.

Figure 6:
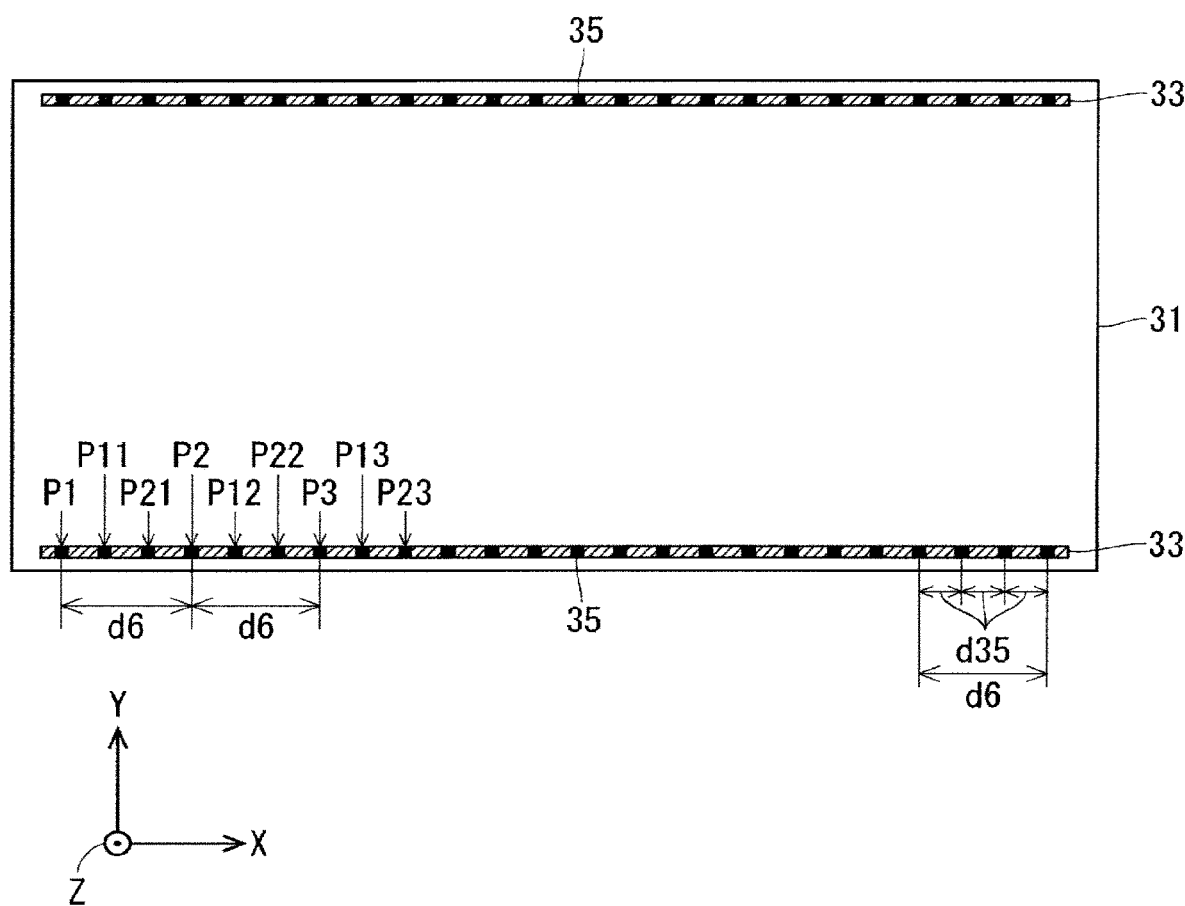
FIG. 6 is an explanatory view illustrating a specific configuration of a bonding target.

This point will be described in detail below. FIG. 6 is an explanatory view illustrating a specific configuration of a bonding target. As illustrated in the view, two linear (current-collecting) electrodes 33 are disposed on the upper surface of the glass substrate 31 along the X direction. A plurality of ultrasonic wave application areas 35 are set, which are a plurality of bonding positions in two electrodes 33. The plurality of ultrasonic wave application areas 35 are equally provided at intervals d35 along the X direction.

Here, it is assumed that the relationship of "d6=3×d35" is established between a formation interval d6 among the ultrasonic bonding head units 61 to 63 and the interval d35 among the plurality of ultrasonic wave application areas 35.

In this case, in step S11 described above, as illustrated in FIG. 6, the ultrasonic bonding portion 16a of the ultrasonic bonding head unit 61 is disposed to be located above an application position P1, the ultrasonic bonding portion 16a of the ultrasonic bonding head unit 62 is disposed to be located above an application position P2, and the ultrasonic bonding portion 16a of the ultrasonic bonding head unit 63 is disposed to be located above an application position P3.

Since the application positions P1, P2, and P3 are application positions disposed at intervals of three ultrasonic wave application areas 35, each of intervals between the application positions P1 to P2 and P2 to P3 is the formation interval d6.

Thereafter, by executing steps S12 to S14 described above, ultrasonic bonding of the glass substrate 31 and the electrode 33 can be performed on the three ultrasonic wave application areas 35 (application positions P1 to P3) by one ultrasonic bonding process constituted of steps S11 to S14.

At a time of a next ultrasonic bonding process, the lifting-lowering servomotor 2X is driven to perform a lifting operation, and the ultrasonic bonding head units 61 to 63 are lifted to be released from the entire bonding portion contact state. Thereafter, in step S11, which is newly executed, the driving unit 19X is controlled to move the three-head traveling frame 11 along the +X direction by an interval d35.

Then, as illustrated in FIG. 6, the ultrasonic bonding portion 16a of the ultrasonic bonding head unit 61 is disposed to be located above an application position P11, the ultrasonic bonding portion 16a of the ultrasonic bonding head unit 62 is disposed to be located above an application position P12, and the ultrasonic bonding portion 16a of the ultrasonic bonding head unit 63 is disposed to be located above an application position P13.

Thereafter, by executing steps S12 to S14 described above, ultrasonic bonding of the glass substrate 31 and the electrode 33 can be performed on the three ultrasonic wave application areas 35 (application positions P11 to P13) by a second ultrasonic bonding process constituted of steps S11 to S14 described above.

Further, at a time of a next ultrasonic bonding process, the lifting-lowering servomotor 2X is driven to perform a lifting operation, and the ultrasonic bonding head units 61 to 63 are lifted to be released from the entire bonding portion contact state. Thereafter, in step S11, which is newly executed, the three-head traveling frame 11 is moved along the +X direction by an interval d35.

Then, as illustrated in FIG. 6, the ultrasonic bonding portion 16a of the ultrasonic bonding head unit 61 is disposed to be located above an application position P21, the ultrasonic bonding portion 16a of the ultrasonic bonding head unit 62 is disposed to be located above an application position P22, and the ultrasonic bonding portion 16a of the ultrasonic bonding head unit 63 is disposed to be located above an application position P23.

Thereafter, by executing steps S12 to S14 described above, ultrasonic bonding of the glass substrate 31 and the electrode 33 can be performed on the three ultrasonic wave application areas 35 (application positions P21 to P23) by a third ultrasonic bonding process constituted of steps S11 to S14.

As a result, ultrasonic bonding of the glass substrate 31 and the electrode 33 can be performed on the nine ultrasonic wave application areas 35 continuously provided at the intervals d35 by three times of the ultrasonic bonding processes.

Thus, the ultrasonic vibration bonding apparatus illustrated in FIGS. 1 to 5 exhibits an effect to be capable of executing the ultrasonic bonding process substantially three times speedily by a relatively simple and inexpensive configuration in which the lifting-lowering servomotor 2X, which is a head unit activation mechanism, is restricted to one unit.

<Ultrasonic Bonding Method>

Hereinafter, an ultrasonic bonding method according to the embodiment will be described. The ultrasonic bonding method of the present embodiment is executed under control of a control unit 15X using the ultrasonic vibration bonding apparatus described with reference to FIGS. 1 to 6.

Figure 7:
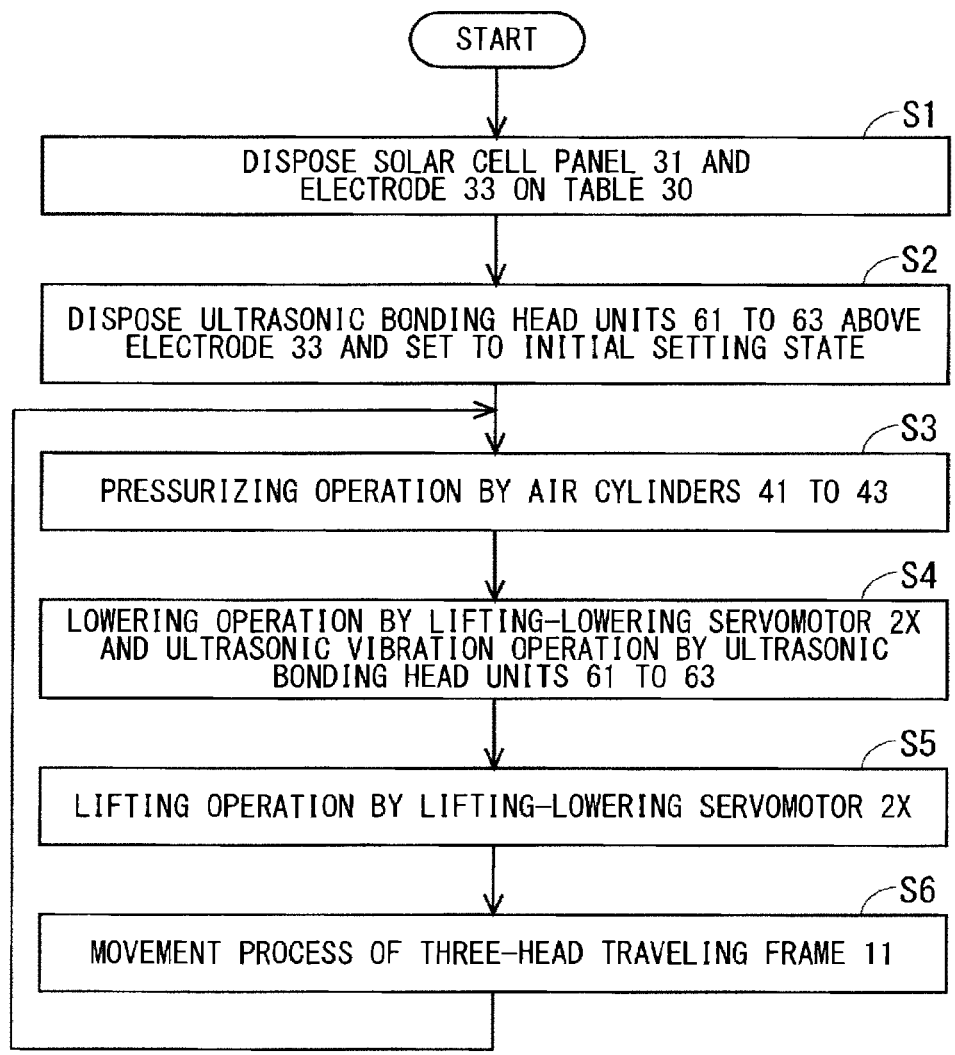
FIG. 7 is a flowchart illustrating a processing procedure of the ultrasonic bonding method according to the embodiment.

FIG. 7 is a flowchart illustrating a processing procedure of the ultrasonic bonding method according to the embodiment. Hereinafter, the ultrasonic bonding method according to the embodiment will be described with reference to the flowchart.

First, in step S1, a glass substrate 31 is disposed on a table 30 and a linear (current collecting) electrode 33 is disposed on an upper surface of the glass substrate 31 (see FIG. 2, FIG. 6, and so on). Therefore, the glass substrate 31 placed on the table 30 and the electrode 33 disposed on the upper surface of the glass substrate 31 are the bonding target as the ultrasonic bonding target.

Next, in step S2, the ultrasonic bonding head units 61 to 63 are disposed above the electrode 33 to be set in an initial setting state.

Then, as illustrated in FIG. 6, the ultrasonic bonding portion 16a of the ultrasonic bonding head unit 61 is disposed to be located above an application position P1, the ultrasonic bonding portion 16a of the ultrasonic bonding head unit 62 is disposed to be located above an application position P2, and the ultrasonic bonding portion 16a of the ultrasonic bonding head unit 63 is disposed to be located above an application position P3.

FIG. 8 is an explanatory view schematically illustrating an initial setting state of the ultrasonic bonding head units 61 to 63. In the view, a bonding reference position H33 is set to a surface height of the electrode 33 as the bonding target.

Here, a height from a center of the ultrasonic bonding portion 16a of the ultrasonic bonding head unit 61 to the bonding reference position H33 is set to an initial height h1. That is, the height from the surface of the electrode 33 as the bonding target to the ultrasonic bonding portion 16a of the ultrasonic bonding head unit 61 is set to the initial height h1 (m).

Similarly, a height from a center of the ultrasonic bonding portion 16a of the ultrasonic bonding head unit 62 to the bonding reference position 1133 is set to an initial height h2 (m). That is, the height from the surface of the electrode 33 to the ultrasonic bonding portion 16a of the ultrasonic bonding head unit 62 is set to the initial height h2.

Similarly, a height from a center of the ultrasonic bonding portion 16a of the ultrasonic bonding head unit 63 to the bonding reference position H33 is set to an initial height h3 (m). That is, the height from the surface of the electrode 33 to the ultrasonic bonding portion 16a of the ultrasonic bonding head unit 63 is set to the initial height h3.

The initial heights h1 to h3 are set so as to satisfy following Formulas (1) and (2). Note that in Formulas (1) and (2), Δg (m) is an adjustment gap length.

$$h1 = h2 + \Delta g \quad (1)$$

$$h2 = h3 + \Delta g \quad (2)$$

As described above, by executing step S2, the initial heights h1 to h3 of the ultrasonic bonding head units 61 to 63 are disposed in an initial setting state satisfying Formulas (1) and (2) in which the length are different from each other.

Note that the length of the piston rod 23 between the air cylinder 4$i$ and the pressurizing slider 5$i$ (i=one of 1 to 3) is changed among the air cylinders 41 to 43 so as to set different heights among the initial heights h1 to h3.

FIGS. 9 and 10 are explanatory views schematically illustrating a method for setting the initial setting state. As illustrated in these views, the piston rod 23 has a screw-like tip region having a length LS at the tip portion. At this tip portion, a nut 71 is attached to an upper side and a nut 72 is attached to a lower side in such a manner that the attaching bracket 75 is sandwiched between the upper and lower sides. For this reason, the attaching bracket 75 is fixed between the nuts 71 and 72 in the tip region of the piston rod 23.

The attaching bracket 75 is a jig for attaching the pressurizing slider 5$i$ (i=one of 1 to 3) at a predetermined position. Therefore, when the position of the attaching bracket 75 is higher than the reference position (positioned on the +Z direction side), the pressurizing slider 51 is attached at a higher position, and consequently, the position of the ultrasonic bonding portion 16$a$ of the ultrasonic bonding head unit 6$i$ attached to the pressurizing slider 5$i$ becomes relatively high.

Conversely, when the position of the attaching bracket 75 is lower than the reference position (positioned on the −Z direction side), the pressurizing slider 5$i$ is attached at a lower position, and consequently, the position of the ultrasonic bonding portion 16$a$ of the ultrasonic bonding head unit 6$i$ attached to the pressurizing slider 5$i$ becomes relatively high.

As illustrated in FIG. 9($a$), when the air cylinder 4 is in the reference state, the length of the piston rod 23 to an upper surface of the attaching bracket 75 is set to a reference distance LA.

Figures 9A, 9B:
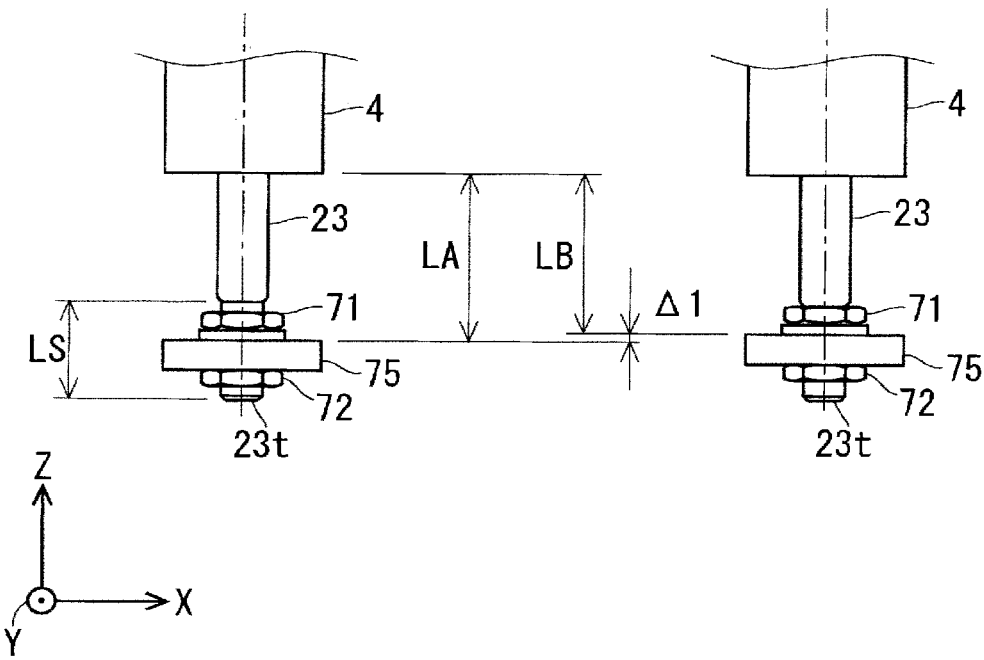
FIGS. 9A and 9B are explanatory views (part 1) schematically illustrating a method for setting an initial setting state.

As illustrated in FIG. 9A, when the air cylinder 4 is in the reference state, the length of the piston rod 23 to an upper surface of the attaching bracket 75 is set to a reference distance LA.

As illustrated in FIG. 9B, when the nuts 71 and 72 are rotated in the first rotation direction from the reference state, the nuts 71 and 72 move upward in the tip region of the piston rod 23. As the nuts 71 and 72 move upward, the attaching bracket 75 sandwiched between the nuts 71 and 72 also moves upward. As a result, a length LB of the piston rod 23 to the upper surface of the attaching bracket 75 can be reduced from the reference distance LA by a displacement amount Δ1.

Figures 10A, 10B:
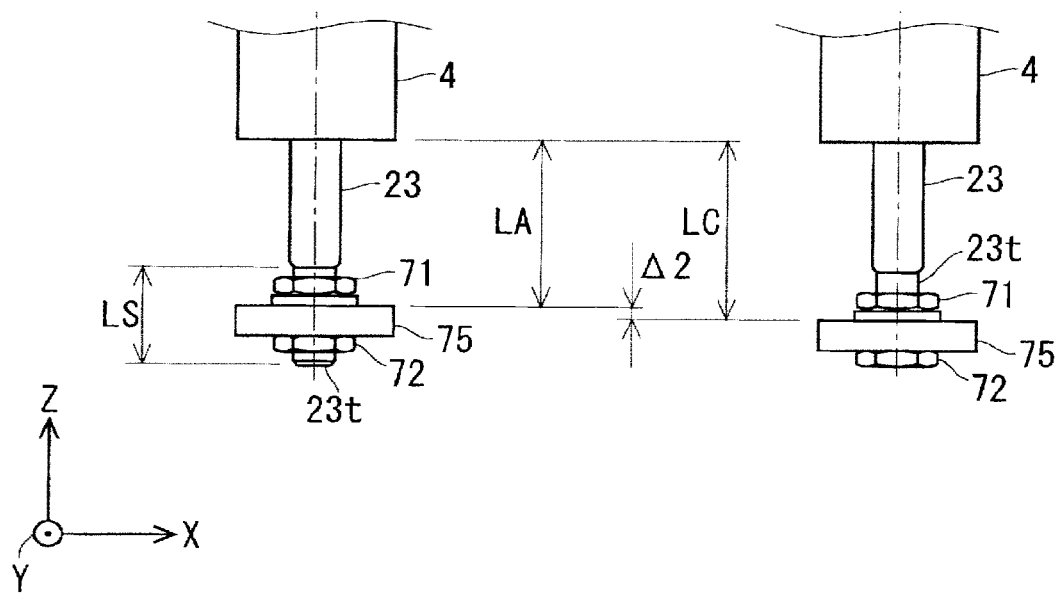
FIGS. 10A and 10B are explanatory views (part 2) schematically illustrating the method for setting the initial setting state.

As illustrated in FIG. 10A, when the air cylinder 4 is in the reference state, the length of the piston rod 23 to the upper surface of the attaching bracket 75 is set to the reference distance LA.

As illustrated in FIG. 10B, when the nuts 71 and 72 are rotated in the second rotation direction (the direction opposite to the first rotation direction) from the reference state, the nuts 71 and 72 move downward in the tip region of the piston rod 23. As the nuts 71 and 72 move downward, the attaching bracket 75 also moves downward. As a result, a length LC of the piston rod 23 to the upper surface of the attaching bracket 75 can be increased from the reference distance LA by a displacement amount Δ2.

For example, by making the displacement amount Δ1 and the displacement amount Δ2 coincide with an adjustment gap length Δg and setting the lengths of the piston rods 23 of the air cylinders 41 to 43 to the upper surface of the attaching bracket 75 to LB, LA, LC, the heights of the ultrasonic bonding portions 16$a$ of the ultrasonic bonding head units 61 to 63 from the bonding reference position H33 can be set to the initial heights h1 to h3 that satisfy Formulas (1) and (2).

As described above, by performing length adjustment of the piston rod 23 illustrated in FIGS. 9 and 10 in advance, the ultrasonic bonding head units 61 to 63 can be disposed in the initial setting state by simply disposing the ultrasonic bonding head units 61 to 63 above the electrode 33.

Therefore, in step S2, the ultrasonic bonding head units 61 to 63 can be disposed above the electrode 33 to be set in the initial setting state that the initial heights h1 to h3 satisfy above-described Formulas (1) and (2).

Returning to FIG. 7, in step S3, the air cylinders 41 to 43 are caused to execute the pressurizing operation with the pressing forces F21 to F23.

In addition, in step S2, the initial heights h1 to h3 of the ultrasonic bonding portions 16$a$ of the air cylinders 41 to 43 are set to different initial setting states. Therefore, a rod stroke L23 in which the piston rod 23 in the initial state is extended downward is different among the air cylinders 41 to 43.

Figure 11:
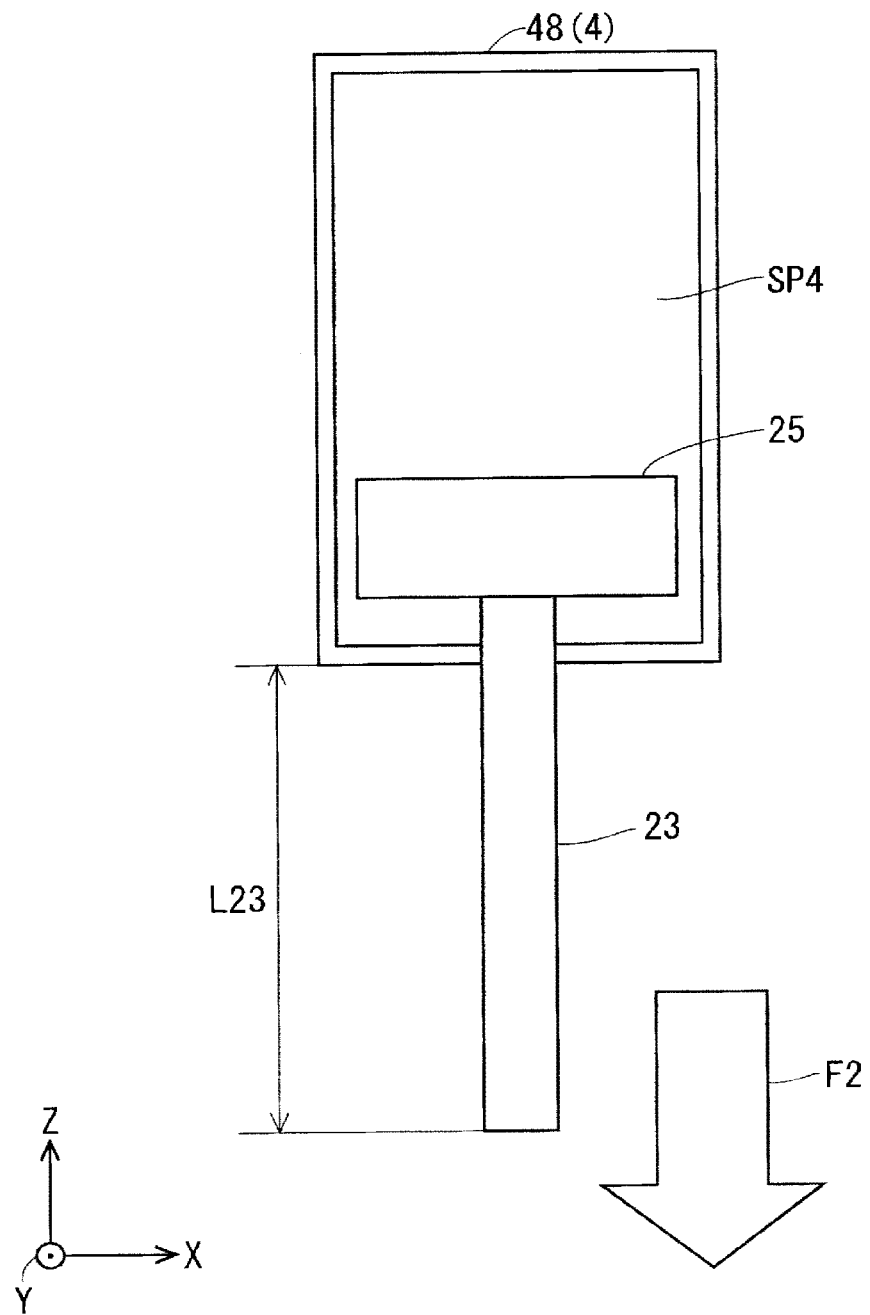
FIG. 11 is an explanatory view (part 1) for considering a pressing force by a piston rod.
Figure 12:
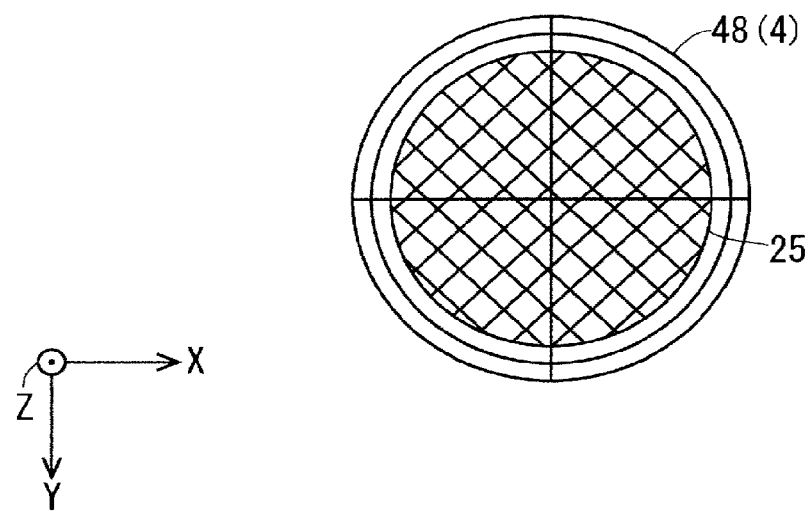
FIG. 12 is an explanatory view (part 2) for considering the pressing force by the piston rod.

FIGS. 11 and 12 are explanatory views for considering the pressing force F2 of the piston rod 23, FIG. 11 illustrates an XZ plane structure of the air cylinder 4, and FIG. 12 illustrates an XY plane structure of the air cylinder 4. It is assumed that a predetermined pressure P4 is applied to a cylinder pressure space SP4 in a cylinder tube 48 that is a main part of the air cylinder 4.

A pressure acts uniformly on the piston 25 having a cross-sectional area S25. Therefore, the pressing force F2 of the air cylinder 4 is expressed by the following Formula (3).

$$F2 = P4 \times S35 \qquad (3)$$

When the predetermined pressure P4 is constant, the pressing force F2 is constant regardless of the rod stroke L23 of the piston rod 23.

Therefore, even when the rod stroke L23 of the piston rod 23 differs among the air cylinders 41 to 43, the pressing forces F21 to F23 of the air cylinders 41 to 43 are not affected.

Returning to FIG. 7, in step S4, the lowering operation by the lifting-lowering servomotor 2X and the ultrasonic vibration operation by the ultrasonic bonding head units 61 to 63 are executed.

The lowering operation by the lifting-lowering servomotor 2X is executed as a batch multiple lowering operation. That is, the screw shaft 21 is rotated in the first rotation direction by driving the lifting-lowering servomotor 2X, thereby executing a batch multiple lowering operation of moving the common lifting-lowering slider 13, the air cylinders 41 to 43, the pressurizing sliders 51 to 53, and the ultrasonic bonding head units 61 to 63 downward at once. At this time, the lifting-lowering servomotor 2X is controlled so that the pressure value in the −Z direction becomes the pressing force F1.

Here, assuming that a lowering speed of the batch multiple lowering operation is V6 (m/min) and an operation time of the ultrasonic vibration operation of each of the ultrasonic bonding head units 61 to 63 is T6 (min), the adjustment gap length Δg and the lowering speed V6, which are parameters of Formula (1) and Formula (2), are set to satisfy the following Inequality (4). Note that the operating time T6 is set to be the same among the ultrasonic bonding head units 61 to 63.

$$T6 < \Delta g / V6 \quad (4)$$

During execution of the batch multiple lowering operation, first, the position detection unit 7 of the air cylinder 43 detects a bonding portion contact state in which the lower tip portion of the ultrasonic bonding portion 16a of the ultrasonic bonding head unit 63 contacts the application portion (bonding position) of the bonding target.

With a contact timing to the application portion of a bonding target portion in the ultrasonic bonding head unit 63 being an execution start timing, the ultrasonic bonding head unit 63 in which the bonding portion contact state is detected executes the ultrasonic vibration operation independently.

Since Inequality (4) is satisfied, the ultrasonic bonding head units 61 and 62 are in a bonding portion non-contact state and the bonding portion contact state is not detected during execution of the ultrasonic vibration operation of the ultrasonic bonding head unit 63.

Therefore, the ultrasonic bonding head units 61 and 62 do not execute the ultrasonic vibration operation during an execution period of the ultrasonic vibration operation of the ultrasonic bonding head unit 63.

After the ultrasonic vibration operation of the ultrasonic bonding head unit 63 is completed, a bonding portion contact state in the ultrasonic bonding head unit 62 is detected by the position detection unit 7 of the air cylinder 42 during execution of the batch multiple lowering operation.

With a contact timing to the application portion of a bonding target portion in the ultrasonic bonding head unit 62 being an execution start timing, the ultrasonic bonding head unit 62 in which the bonding portion contact state is detected executes the ultrasonic vibration operation independently.

The ultrasonic vibration operation of the ultrasonic bonding head unit 63 has already been completed. Since Inequality (4) is satisfied, the ultrasonic bonding head unit 61 is in a bonding portion non-contact state and the bonding portion contact state is not detected during execution of the ultrasonic vibration operation of the ultrasonic bonding head unit 62.

Therefore, the ultrasonic bonding head units 61 and 63 do not execute the ultrasonic vibration operation during an execution period of the ultrasonic vibration operation of the ultrasonic bonding head unit 62.

After the ultrasonic vibration operation of the ultrasonic bonding head unit 62 is completed, a bonding portion contact state in the ultrasonic bonding head unit 61 is detected by the position detection unit 7 of the air cylinder 41 during execution of the batch multiple lowering operation.

With a contact timing to the application portion of a bonding target portion in the ultrasonic bonding head unit 61 being an execution start timing, the ultrasonic bonding head unit 61 in which the bonding portion contact state is detected executes the ultrasonic vibration operation independently.

Since the ultrasonic vibration operations of the ultrasonic bonding head units 62 and 63 have already been completed, the ultrasonic bonding head units 62 and 63 do not execute the ultrasonic vibration operation during an execution period of the ultrasonic vibration operation of the ultrasonic bonding head unit 61.

As described above, the ultrasonic bonding method according to the embodiment executes step S2 of setting an initial setting state that satisfies above-described Formulas (1) and (2), so as to set the adjustment gap length $\Delta g$, which is an important parameter for Formulas (1) and (2), to a length that satisfies Inequality (4).

For this reason, in the ultrasonic bonding method according to the embodiment, in step S4, three ultrasonic vibration operations (a plurality of ultrasonic vibration operations) can be executed among the ultrasonic bonding head units 61 to 63, which are a plurality of ultrasonic bonding head units, so that an ultrasonic time condition that the three ultrasonic vibration operations do not overlap in time is satisfied.

That is, satisfying Formulas (1), (2), and Inequality (4) is equivalent to satisfying the ultrasonic time condition.

Consequently, in the ultrasonic bonding method according to the embodiment, an ultrasonic wave motion generated when one ultrasonic vibration operation out of the three ultrasonic vibration operations is executed does not adversely affect the other two ultrasonic vibration operations. Thus, ultrasonic bonding can be performed with high accuracy on three bonding positions (a plurality of bonding positions) of the bonding target.

In the ultrasonic bonding method according to the embodiment, in step S4, the batch multiple lowering operation is executed at the lowering speed V6 that satisfies Inequality (4) using the adjustment gap length $\Delta g$ and the operation time T6 of the ultrasonic vibration operation as parameters.

For this reason, in the ultrasonic bonding method according to the embodiment, in step S4, it is possible to automatically execute three ultrasonic vibration operations by the ultrasonic bonding head units 61 to 63 so that the ultrasonic time condition is always satisfied during execution of the batch multiple lowering operation by the lifting-lowering servomotor 2X.

The glass substrate 31 and the electrode 33 disposed on the glass substrate 31 correspond to the bonding target. Therefore, the ultrasonic bonding method of the present embodiment can accurately bond the electrode 33, which is a collecting electrode, onto the glass substrate 31, which is a solar cell substrate.

As a structure for providing a glass substrate 31 as a solar cell substrate with a solar electric function, for example, a glass substrate 31 having a structure in which a surface electrode layer, a power generation layer, a back electrode layer, and a protective film are stacked on glass is conceivable.

Further, as illustrated in FIG. 1, in the ultrasonic vibration bonding apparatus used in the embodiment, the ultrasonic bonding portion 16a of the ultrasonic bonding head unit 61, the ultrasonic bonding portion 16a of the ultrasonic bonding head unit 62, and the ultrasonic bonding portion 16a of the ultrasonic bonding head unit 63 are disposed evenly every interval d6 along the X direction.

Therefore, by executing steps S2 to S4 once, ultrasonic bonding can be performed at once on the three (at least two) application portions (bonding positions) along the X direction (predetermined direction) in plan view with respect to the bonding target.

As described above, in the present embodiment, the adjustment gap length $\Delta g$ among the initial heights h1 to h3, the lowering speed V6 of the batch multiple lowering operation by the lifting-lowering servomotor 2X, and the operation time T6 of the ultrasonic vibration operation of the ultrasonic bonding head units 61 to 63 are set so as to satisfy Inequality (4) that is the ultrasonic time condition.

In the ultrasonic bonding method of the present embodiment, by setting the adjustment gap length $\Delta g$, the lowering speed V6, and the operating time T6 so as to satisfy Inequality (4), the above-described ultrasonic time condition can be satisfied relatively easily without having a special function on the ultrasonic vibration bonding apparatus side.

Returning to FIG. 7, in step S5, the lifting-lowering servomotor 2X performs a lifting operation.

The lifting-lowering servomotor 2X is driven to perform a lifting operation, and the ultrasonic bonding head units 61 to 63 are lifted to release all the ultrasonic bonding head units 61 to 63 from the bonding portion contact state and brought into a bonding non-contact state.

Then, the (initial) heights h1 to h3 of the ultrasonic bonding portions 16a of the ultrasonic bonding head units 61 to 63 from the bonding reference position H33 return to the initial setting state satisfying Formulas (1) and (2). This is because the length adjustment of the piston rod 23 illustrated in FIGS. 9 and 10 has already been performed so as to satisfy Inequality (4).

Thereafter, in step S6, the driving unit 19X is controlled to move the three-head traveling frame 11 along the +X direction by an interval d35.

Then, as illustrated in FIG. 6, the ultrasonic bonding portion 16a of the ultrasonic bonding head unit 61 is disposed to be located above an application position P11, the ultrasonic bonding portion 16a of the ultrasonic bonding head unit 62 is disposed to be located above an application position P12, and the ultrasonic bonding portion 16a of the ultrasonic bonding head unit 63 is disposed to be located above an application position P13.

Thereafter, by returning to step S3 to execute steps S3 and S4 described above again, ultrasonic bonding of the glass substrate 31 and the electrode 33 can be performed on the three ultrasonic wave application areas 35 (application positions P11 to P13) by a second ultrasonic bonding process constituted of steps S3 and S4 described above.

Thereafter, by executing steps S3 and S4 after being through steps S5, S6, ultrasonic bonding of the glass substrate 31 and the electrode 33 can be performed on the three ultrasonic wave application areas 35 (application positions P21 to P23) by a third ultrasonic bonding process constituted of steps S3 and S4.

In this manner, the ultrasonic bonding method according to the embodiment repeats the reference process constituted of steps S3 to S6 multiple times, so that the relatively long electrode 33 (bonding region) along the X direction (predetermined direction) in the bonding target can be accurately performed.

<Others>

Note that in the present embodiment, although the ultrasonic bonding portions 16a of the three ultrasonic bonding head units 61 to 63 are disposed in a line along the X direction (predetermined direction), the present embodiment is not limited thereto, and a modification example of disposing the ultrasonic bonding head units in a plurality of rows along the predetermined direction is also conceivable. Specifically, ultrasonic bonding portions of six ultrasonic bonding head units may be disposed in a configuration of 3 (X direction)×2 (Y direction) in a matrix form, a two-row configuration along the Y direction with three units disposed along the X direction for every row.

In the case of the above specific example, by executing steps S2 to S4 once, ultrasonic bonding can be performed at once on the three (at least two) application portions (bonding positions) along the X direction (predetermined direction), a total of six application units in a two-row configuration along the Y direction in plan view, with respect to the bonding target.

Although the present invention has been described in detail, the above description is illustrative in all aspects, and the present invention is not limited thereto. It is understood that innumerable modifications not illustrated can be envisaged without departing from the scope of the present invention.

The invention claimed is:

1. An ultrasonic bonding method performed using an ultrasonic vibration bonding apparatus, wherein
said ultrasonic vibration bonding apparatus includes a plurality of ultrasonic bonding head units that each have an ultrasonic bonding portion, and that execute a plurality of ultrasonic vibration operations by applying ultrasonic vibrations from a plurality of ultrasonic bonding portions, and
said ultrasonic bonding method comprises the steps of:
(a) disposing a bonding target on a table; and
(b) controlling said plurality of ultrasonic bonding head units to execute said plurality of ultrasonic vibration operations on said bonding target as an ultrasonic bonding target, wherein
said step (b) causes said plurality of ultrasonic vibration operations to be executed so as to satisfy an ultrasonic time condition in which said ultrasonic vibration operations do not overlap in time among said plurality of ultrasonic bonding head units, wherein
said ultrasonic vibration bonding apparatus further comprises a head unit moving mechanism that lowers said plurality of ultrasonic bonding head units at once to execute a lowering operation, wherein
said step (b) includes the steps of:
(b-1) disposing said plurality of ultrasonic bonding head units above said bonding target and (b-2) controlling said head unit moving mechanism to execute said lowering operation, and assuming a contact timing of each of said plurality of ultrasonic bonding portions to said bonding target as an execution start timing of said plurality of ultrasonic vibration operations, so as to execute said plurality of ultrasonic vibration operations, wherein
said step (b-1) disposes said plurality of ultrasonic bonding head units in an initial setting state so that a plurality of initial bonding heights as heights from said bonding target to said plurality of ultrasonic bonding portions become different heights from each other, and
said step (b-2) executes said plurality of ultrasonic vibration operations so that the contact timing to said bonding target do not overlap among said plurality of ultrasonic bonding head units.

2. The ultrasonic bonding method according to claim 1, wherein after execution of said step (b-1), at least two ultrasonic bonding portions of said plurality of ultrasonic bonding portions are disposed along a predetermined direction in plan view.

3. The ultrasonic bonding method according to claim 2, wherein
said ultrasonic vibration bonding apparatus is movable along said predetermined direction,
said head unit moving mechanism further executes a lifting operation of lifting said plurality of ultrasonic bonding head units at once, and said ultrasonic bonding method further comprises the steps of:
(c) controlling said head unit moving mechanism after executing said step (b) to execute said lifting operation, so as to return said plurality of ultrasonic bonding portions to said initial setting state; and (d) moving said ultrasonic vibration bonding apparatus along said predetermined direction after executing said step (c).

4. The ultrasonic bonding method according to claim 1, wherein said plurality of initial bonding heights, a lowering speed in said lowering operation by said head unit moving mechanism, and an operation time of said plurality of ultrasonic vibration operations are set to satisfy said ultrasonic time condition.

5. The ultrasonic bonding method according to claim 1, wherein said bonding target is an electrode selectively disposed on a solar cell substrate having a solar cell function inside.

* * * * *